Mar. 6, 1923.

A. T. JONES.
PHOTOGRAPHIC REFLECTOR.
FILED AUG. 15, 1922.

1,447,475.

Inventor,
Arthur Thomas Jones
By Toulmin & Toulmin, Attys.

Patented Mar. 6, 1923.

1,447,475

UNITED STATES PATENT OFFICE.

ARTHUR THOMAS JONES, OF TOTTENHAM, LONDON, ENGLAND.

PHOTOGRAPHIC REFLECTOR.

Application filed August 15, 1922. Serial No. 582,027.

*To all whom it may concern:*

Be it known that I, ARTHUR THOMAS JONES, of 128 The Roundway, Lordship Lane, Tottenham, London, England, a subject of the King of Great Britain and Ireland, have invented a new and useful Photographic Reflector (for which I have filed an application in Great Britain Feb. 14, 1921, No. 182,508), of which the following is a specification.

An outstanding difficulty attendant on photographing in studios by artificial light is that of securing sufficient illumination to admit of short or so-called instantaneous exposures without either employing a large and costly installation of lamps or, where this convenience is lacking, subjecting the sitter to an unpleasant proximity with, and the accompanying glare from, such lesser number of lamps as may be available. Where the latter alternative is in force it becomes increasingly hard to correct, by means of the diffusing and reflecting media at present used for this purpose, the tendency to harsh shadows and exaggerated highlights in the resulting portrait.

The device which is the subject of this application is intended to cope with the problems set forth above and, whilst its peculiar conformation puts to profitable use a large amount of light from each lamp that would ordinarily be wasted thus materially reducing the total candle power otherwise needful for a given exposure, it moreover, by reflecting and counter-reflecting most of the available light upon the sitter from an infinite number of angles, induces a quality of illumination more nearly approaching that afforded by daylight, with a resultant improvement in modelling and an avoidance of abrupt inequalities of light and shade.

As will be better understood as this description proceeds when read in connection with the accompanying drawings.

Figure 2:
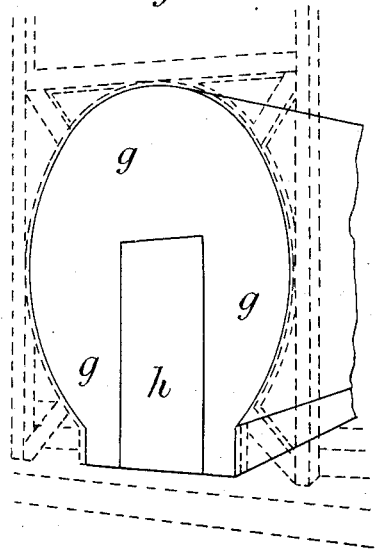
Fig. 2 is a view of the device seen from the outside.

My invention consists of a whitened or light-tinted tunnel-shaped reflector, curved, rounded or polygonal in transverse section as to its sides and roof and of sufficient dimensions to permit of the posing or arrangement within itself of the persons or objects to be photographed. The said reflector may consist of a framework covered with sheets of canvas, thin wood, metal or other suitable material, or it may be of any other preferred construction embodying the features claimed as novel in this application. That end of the tunnel behind the sitter is more or less occupied by curtains or a background, the opposite extremity having arranged across it an end-screen or reflecting surface, light in colour and calculated to throw back upon the sitter any needed light that might otherwise escape from the tunnel unused. Such end-screen may actually close in the tunnel-end, as shown in Figure 2 of the appended drawings, (in which case it should be furnished with an opening for convenience of access,) or the said screen may be arranged at a sufficient distance from the tunnel to admit of persons readily entering the latter. The front-lighting effects produced by the end-screen can be modified by the familiar expedient of having dark curtains slidably arranged in front of the latter in order to reduce or eliminate at will its capacity for reflection.

Figure 1:
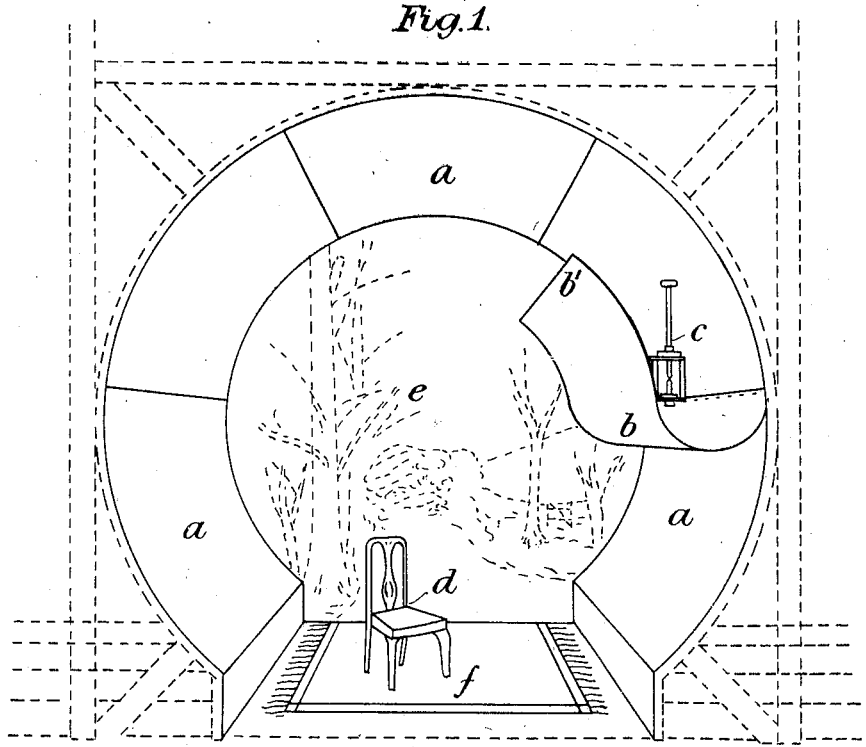
Fig. 1 is a front view of my device.

The source of light, which may consist of one or more arc lamps or of any other approved illuminating appliances, is placed within the tunnel or arranged outside the latter so as to light up the interior of the same through suitable openings or through portions of the tunnel formed for this purpose of a translucent substance. It has been found in practice that the best results are obtained when the illuminant is placed within the tunnel at one side of the same, the sitter being shielded from the lamps' direct rays by a light-coloured screen, opaque or slightly translucent in character according to the effect desired, and curved as to its free upper portion in a direction roughly parallel with the roof of the tunnel, as shown in Figure 1 of the attached drawings. Where this arrangement is adopted small parts of the tunnel wall in proximity to the lamps may be made removable to afford access to the said lamps for cleaning purposes.

Figure 3:
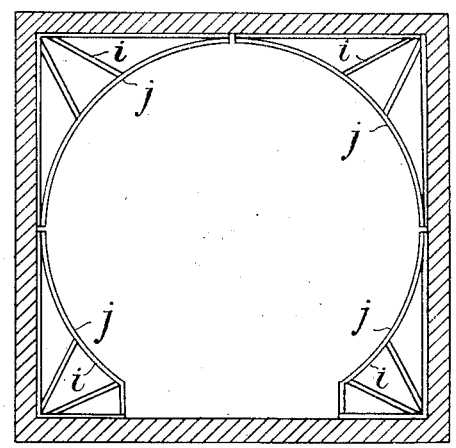
Fig. 3 is a sectional view showing the sections of the tunnel and their interfitting relation with the sides of the room.

An easily portable form of the tunnel-shaped reflector claimed herein consists of a set of four rectangular frames, having curved inner surfaces suitably covered with light-coloured fabric, the whole being of such dimensions and transverse section that, upon the said frames being fixed respectively into the angles made by the side walls of a room with its ceiling and floor, as shown in Figure 3, and being used in conjunction with such front lighting reflector-screen as has already been described, the effect is to convert that portion of a room so treated into a tunnel-shaped reflector similar in operation to that which is the subject of this application.

In Fig. 1 is shown a front view of an improved form of the tunnel-shaped reflector *a*, *a*, *a*, with the end-screen removed to show the relation of the above-described lamp-screen, herein marked *b* and having curved upper portion *b'*, to the illluminant *c* and the sitter's stool *d*. A background *e* and rug or carpet *f* are also shown.

In Figure 2 is shown an external view of that extremity of the tunnel facing the sitter. This figure also shows an end-screen *g*, *g*, *g*, in position, an opening *h* being left for convenient access to the interior of the tunnel.

In Figure 3 is shown a transverse section of a room fitted with four portable rectangular frameworks *i*, *i*, *i*, *i*, having curved inner surfaces *j*, *j*, *j*, *j*, covered with light-tinted fabric and combined to form a tunnel-shaped reflector substantially as described herein.

What I claim and desire to secure by Letters Patent is:

1. An apparatus for photographic purposes comprising a chamber, a reflector within said chamber having curved inner surfaces extending from near said chamber floor around the sides and across the top thereof, said reflector being composed of sectional frames fitting within said chamber, and extending inwardly from the chamber corners to the curved portion of said reflector, means at the ends of said tubular member for reflecting light and a source of light within said tubular member.

2. An apparatus for photographic purposes comprising a chamber, a tubular member made up of a plurality of elements supported in frames fitted within said chamber corners, each of said elements having an inner surface of arcuate shape adapted to reflect light onto an object disposed within said tubular member, and an end screen also adapted to reflect a quantity of light on an object disposed within said tubular member, a doorway to said end screen, an illuminating lamp within said tubular member throwing its rays onto said reflecting surface and screen, and an arcuate shield disposed between said lamp and said object.

In testimony whereof, I affix my signature.

ARTHUR THOMAS JONES.